United States Patent
Bucourt et al.

[15] 3,697,510
[45] Oct. 10, 1972

[54] NOVEL PREPARATION OF PREGNANES

[72] Inventors: Robert Bucourt; Lucien Nedelec, both of Clichy-sous-Bois; Jean-Claude Gasc, Bondy; Andre Pierdet, Noisy le Sec, all of France

[73] Assignee: Roussel Uclaf, Paris, France

[22] Filed: Oct. 20, 1970

[21] Appl. No.: 82,482

[30] Foreign Application Priority Data

March 4, 1970 France......................7007756

[52] U.S. Cl................260/239.55 R, 260/239.55 C, 260/397.45, 260/397.5, 260/999

[51] Int. Cl............................................C07c 173/00
[58] Field of Search....... Machine Searched Steroids

[56] References Cited

UNITED STATES PATENTS

| | | | |
|---|---|---|---|
| 3,236,868 | 2/1966 | Bowers | 260/397.45 |
| 3,280,155 | 10/1966 | Schneider et al. | 260/397.3 |
| 3,531,503 | 9/1970 | Cereghetti et al. | 260/397.3 |

*Primary Examiner*—Henry A. French
*Attorney*—Hammond & Littell

[57] ABSTRACT

Novel process for the preparation of steroids of the pregnane series from certain estrane derivatives which pregnanes are intermediates for cortisone derivatives.

16 Claims, No Drawings

NOVEL PREPARATION OF PREGNANES

STATE OF THE ART

The total synthesis of 19-nor steroids such as steroids of the estrane series has become an industrial reality using processes described in "Comptes Rendus de l'Ac. Sciences," Vol. 250 (1960) p. 1,084 and 1293, Angewandte Chemie, 1960, p. 725 and 1965, p. 185 and Chem. and Eng. News, Mar. 2, 1964, p. 42.

Since then, synthetic methods have been attempted for the preparation of cortisonic steroids. One of the first attempts was the alkylation in the 10-position of intermediates in the synthesis such as described in French Pat. Nos. 1,255,101 and 1,550,974.

Several processes have been known for a long time for the construction of a side chain in the 17-position but so far as is known, none have been commercially used because of their laborious character and the mediocre yields that they give.

OBJECTS OF THE INVENTION

It is an object of the invention to provide a novel process for the preparation of pregnane compounds from estrane compounds.

It is a further object of the invention to provide novel intermediate compounds useful in the novel process.

These and other objects and advantages of the invention will become obvious from the following detailed description.

THE INVENTION

The novel process of the invention for the preparation of $\Delta^{4,9(11)}$-pregnadiene-17$\alpha$-ol-3,20-dione comprises reacting a 3-alkylenedioxy-$\Delta^{5(10),9(11)}$-estradiene-17-one with an alkali metal cyanide in an acidic media to form 3-alkylenedioxy-17$\beta$-cyano-$\Delta^{5(10),9(11)}$-estradiene-17$\alpha$-ol, reacting the latter with a trialkyl silylating agent to form the corresponding 3-alkylenedioxy-17$\beta$-cyano-17$\alpha$-trialkylsilanoxy-$\Delta^{5(10),9(11)}$-estradiene, reacting the latter with a per acid to form the corresponding 3-alkylenedioxy-5$\alpha$,10$\alpha$-epoxy-17$\alpha$-trialkylsilanoxy-17$\beta$-cyano-$\Delta^{9(11)}$-estrene and reacting the latter with a methyl magnesium halide to obtain 3-alkylenedioxy-$\Delta^{9(11)}$-pregnene-5$\alpha$, 17$\alpha$-diol-20-one. The latter product can be reacted in a step by treatment with an acidic agent to form $\Delta^{4,9(11)}$-pregnadiene-17$\alpha$-ol-3,20-dione.

The starting materials for the process of the invention, the 3-alkylenedioxy-$\Delta^{5(10),9(11)}$-estradiene-17-ones, are described in French Pat. No. 1,336,083. In a modification of the invention, the 3-alkylenedioxy derivative can be replaced with a 3,3-dilower alkoxy derivative but the starting material is preferably the 3-ethylenedioxy derivative.

The reaction of the 17$\beta$-cyano compound to form the corresponding 17$\alpha$-trialkylsilanoxy-17$\beta$-cyano derivative is effected by reaction with a tri lower alkyl silyl halide such as trimethyl silyl chloride in a substantially anhydrous aklaline medium such as pyridine.

The formation of the 5$\alpha$, 10$\alpha$-epoxy group can be formed after or before the formation of the 17$\alpha$-triloweralkyl silanoxy group although it is preferably formed after. The epoxy group is formed by reaction with a per carboxylic acid such as perphthalic acid, perbenzoic acid, per-p-nitrobenzoic acid, performic acid or peracetic acid in an organic solvent such as aromatic hydrocarbons, halogenated hydrocarbons or ethers.

The reaction of the 17$\alpha$-triloweralkyl silanoxy-17$\beta$-cyano derivative is preferably effected with the methyl magnesium halide in an organic solvent. The halide is preferably the chloride, bromide or iodide and the solvent may be tetrahydrofuran. The trilower alkylsilanoxy group is easily hydrolyzable.

The 3-alkylenedioxy-$\Delta^{9(11)}$-pregnene-5$\alpha$, 17$\alpha$-diol-20-one produced by the process of the invention can be treated under acidic conditions to simultaneously remove the alkylene ketal and dehydrate the compound in the 4,5 position. Preferably the reaction is effected with a sulfonic resin in the acid form in an alcoholic media containing a small amount of water to form $\Delta^{4,9(11)}$-pregnadiene-17$\alpha$-ol-3,20-dione. This latter product is a valuable intermediate for the preparation of valuable cortisone derivatives. For example, a functional oxygen group can be added to the 11-position and a 9$\alpha$-fluoro group can be added by well known methods as described by Fieser and Fieser in STEROIDE, Velag Chemie 1961, P. 754 and 786. An alcohol or esterified alcohol can be introduced in the 21-position using the process of French Pat. No. 1,273,729.

In the following examples there are described several preferred embodiments to illustrate the invention. However, it should be understood that the invention is not intended to be limited to the specific embodiments.

EXAMPLE I

Preparation OF 3-ethylenedioxy-$\Delta^{9(11)}$-pregnene-5$\alpha$, 17$\alpha$-diol -20-one STEP A: 24 gm of 3-ethylenedioxy-$\Delta^{5(10),9(11)}$-estradiene-17-one (described in French Pat. No. 1,336,083) were dissolved in 1,500 cc of anhydrous methanol and then 53 gm of potassium cyanide were added thereto followed by the addition of 37 cc of glacial acetic acid over 15 minutes. The reaction mixture was stirred at 20° C. for 20 hours and then another 15 cc of acetic acid were added. The mixture was stirred for a few minutes and then was poured into water and extracted with methylene chloride. The organic extracts were washed with sodium bicarbonate solution and with water, were dried and evaporated to dryness in vacuo. The residue was crystallized from a mixture of methylene chloride-methanol (5-1) and then from isopropyl ether, to obtain a 90 percent yield of 3-ethylenedioxy-17$\beta$-cyano-$\Delta^{5(10),9(11)}$-estradiene-17$\alpha$-ol melting at 233°–234° C. and having a specific rotation $[\alpha]_D^{20} = +164°$ ($c = 0.4$ percent in chloroform.)

The product occurred as white crystals soluble in methylene chloride and insoluble in methanol and isopropyl ether.

Analysis:
| | %C | %H | %N |
|---|---|---|---|
| Calculated: | 73.87 | 7.97 | 4.10 |
| Found: | 73.8 | 7.9 | 3.8 |

STEP B: 0.345 gm of 3-ethylenedioxy-17$\beta$-cyano-$\Delta^{5(10),9(11)}$-estradiene-17$\alpha$-ol were dissolved in 5 cc of pyridine and then 1 cc of chlorotrimethyl silane was added thereto. The reaction mixture was stirred under a nitrogen atmosphere at 20°–25° C. for 3 hours. The mixture was added to a saturated aqueous sodium bicarbonate solution and the mixture was then extracted with methylene chloride. The organic extracts were washed with water, dried and evaporated to dryness in vacuo. The residue was used as is for the next step.

The residue, which was 3-ethylenedioxy-17α-trimethylsilanoxy-17β-cyano-Δ$^{5(10),9(11)}$-estradiene, was obtained in about quantitative yields in the form of an oily product soluble in chloroform and alcohol and insoluble in water.

The IR spectrum confirmed the absence of hydroxyl and the presence of bands corresponding to nitrile, ketal and double bond functions as well as supplementary intense absorptions at about 9.1 μ, 10.9 μ, 11.6 μ and 11.9 μ.

STEP C: 0.41 gm of 3-ethylenedioxy-17α-trimethylsilanoxy-17β-cyano-Δ$^{5(10),9(11)}$-estradiene were dissolved in 14 cc of chloroform and after the solution was cooled to 0° C. under a nitrogen atmosphere, it was poured over 6 minutes into 0.215 gm of m-chloroperbenzoic acid titrating about 80 percent. The reaction mixture was held at 0° C. and was stirred for 15 minutes and then was poured into a saturated aqueous sodium bicarbonate solution. The phases were separated by decantation and the organic phase was washed with water, dried and evaporated to dryness. The residue was subjected to chromatography over silica gel with elution with benzene containing 10 percent of ethyl acetate to obtain about 60 percent yield of 3-ethylenedioxy-5α, 10α-epoxy-17α-trimethylsilanoxy-17β-cyano-Δ$^{9(11)}$-estradiene melting at 150°–155° C.

The product occurred in the form of white crystals soluble in chloroform and ethanol and insoluble in water.

STEP D: 1.3 gm of 3-ethylenedioxy-5α, 10α-epoxy-17α-trimethylsilanoxy-17β-cyano-Δ$^{9(11)}$-estrene were dissolved in 15 cc of anhydrous tetrahydrofuran and then 35 cc of a molar solution of methyl magnesium bromide in tetrahydrofuran were added thereto. The reaction mixture was stirred under a nitrogen atmosphere for 1½ hours at room temperature and after heating the solution to reflux, the volume of the solution was reduced to about 15 cc. The concentrated solution was refluxed for 4 hours and was then allowed to stand at 20°–25° C. overnight. The reaction mixture was diluted with tetrahydrofuran and was then poured into a concentrated solution of ammonium chloride. The reaction mixture was extracted with methylene chloride and the extracts were washed with water, dried and evaporated to dryness in vacuo. The residue was subjected to chromatography over silica gel with elution with chloroform containing 10 percent of acetone to obtain a 60 percent yield of 3-ethylenedioxy-Δ$^{9(11)}$-pregnene-5α, 17α-diol-20-one melting at 160° C.

The product occurred in the form of crystals soluble in chloroform and ethanol and insoluble in water.

EXAMPLE II

Preparation OF Δ$^{4,9(11)}$-pregnadiene-17α-ol-3,20-dione 64 mg of 3-ethylenedioxy-Δ$^{9(11)}$-pregnene-5α, 17α-diol-20-one were dissolved in 1.5 cc of 95 percent ethanol and then 0.5 gm of a cationic sulfonic exchange resin in the acid form were added thereto. The reaction mixture was heated to reflux under a nitrogen atmosphere and after stirring for 4 hours, the mixture was cooled and filtered. The filtrate was evaporated to dryness and the residue was crystallized from ethyl ether to obtain about a 50 percent yield of Δ$^{4,9(11)}$-pregnadiene-17α-ol-3,20-dione which was identical to a sample of the product obtained in another fashion.

Various modifications of the process of the invention may be made without departing from the spirit or scope thereof and it is to be understood that the invention is to be limited only as defined in the appended claims.

We claim:

1. A process for the production of a compound selected from the group consisting of 3-alkylenedioxy-Δ$^{9(11)}$-pregnene-5α, 17α-diol-20-one and 3,3-dilower alkoxy-Δ$^{9(10)}$-pregnene-5α, 17α-diol-20-one [Δ$^{4,9(11)}$-pregnadiene-17α-ol-3,20-dione] comprising reacting a compound selected from the group consisting of 3-alkylenedioxy-Δ$^{5(10),9(11)}$-estradiene-17-one and 3,3-dilower alkoxy-Δ$^{5(10),9(11)}$-estradiene-17-one with an alkali metal cyanide in an acid media to form the corresponding 17β-cyano-Δ$^{5(10),9(11)}$-estradiene-17α-ol, reacting the latter with a trilower aklyl silyl halide to form the corresponding 17β-cyano-17α-trialkyl silanoxy-Δ$^{5(10),9(11)}$-estradiene, reacting the latter with a percarboxylic acid to form the corresponding 5α, 10α-epoxy-17α-trialkyl silanoxy-17β-cyano-Δ$^{9(11)}$-estrene, reacting the latter with a methyl magnesium halide to obtain the corresponding Δ$^{9(11)}$-pregnene-5α, 17α-diol-20-one.

2. The process of claim 1 wherein the starting compound is 3-ethylenedioxy-Δ$^{5(10),9(11)}$-estradiene-17-one.

3. The process of claim 1 wherein the alkali metal cyanide is potassium cyanide.

4. The process of claim 1 wherein the trialkylsilylating halide is trimethylsilyl chloride.

5. The process of claim 1 wherein the percarboxylic acid is selected from the group consisting of perphthalic acid, perbenzoic acid, per-p-nitrobenzoic acid, performic acid and peracetic acid.

6. The process of claim 1 wherein the methyl magnesium halide is selected from the group consisting of chloride, bromide and iodide.

7. The process of claim 1 wherein the final product is reacted with an aqueous acidic agent to form Δ$^{4,9(11)}$-pregnene-17α-ol-3,20-dione.

8. The process of claim 7 wherein the acidic agent is a sulfonic acid resin in the acid form in a lower alkanol containing a small amount of water.

9. A compound of the formula

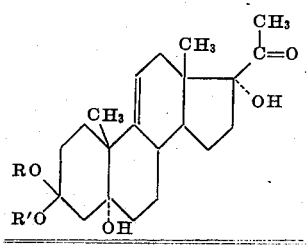

wherein R and R' are lower alkyl and when taken together form a lower alkylene.

10. A compound of claim 9 wherein R and R' taken together are ethylene.

11. A compound of the formula

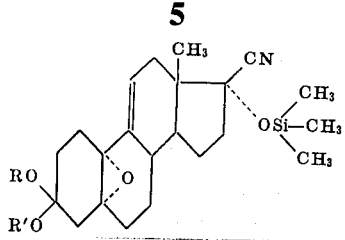

wherein R and R' are lower alkyl and when taken together form a lower alkylene.

12. The compound of claim 11 wherein R and R' taken together are ethylene.

13. A compound of the formula

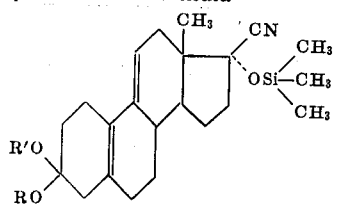

wherein R and R' are lower alkyl and when taken together form a lower alkylene.

14. A compound of claim 13 wherein R and R' taken together are ethylene.

15. A compound of the formula

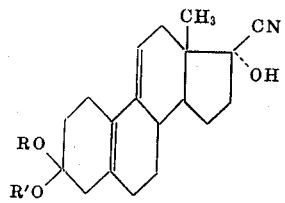

wherein R and R' are lower alkyl and when taken together form a lower alkylene.

16. A compound of claim 15 when R and R' taken together are ethylene.

* * * * *